(12) United States Patent
Vermogen et al.

(10) Patent No.: US 12,312,469 B2
(45) Date of Patent: May 27, 2025

(54) COMPOSITION COMPRISING A COMPOUND WITH TWO POLYMERIZABLE GROUPS, A MULTISTAGE POLYMER AND A THERMOPLASTIC POLYMER, ITS METHOD OF PREPARATION, ITS USE AND ARTICLE COMPRISING IT

(71) Applicant: Arkema France, Colombes (FR)

(72) Inventors: Alexandre Vermogen, Pierrebenite (FR); Aline Couffin, Lacq (FR); Kevin Yocca, King of Prussia, PA (US)

(73) Assignee: Arkema France, Puteaux (FR)

( * ) Notice: Subject to any disclaimer, the term of this patent is extended or adjusted under 35 U.S.C. 154(b) by 598 days.

(21) Appl. No.: 17/619,271

(22) PCT Filed: Jun. 26, 2020

(86) PCT No.: PCT/EP2020/068107
§ 371 (c)(1),
(2) Date: Dec. 15, 2021

(87) PCT Pub. No.: WO2020/260638
PCT Pub. Date: Dec. 30, 2020

(65) Prior Publication Data
US 2022/0298336 A1 Sep. 22, 2022

(30) Foreign Application Priority Data
Jun. 26, 2019 (FR) .................. FR19.06954

(51) Int. Cl.
*C08L 9/10* (2006.01)
*C08F 283/01* (2006.01)
*C08L 33/12* (2006.01)
*C08L 51/04* (2006.01)

(52) U.S. Cl.
CPC .............. *C08L 9/10* (2013.01); *C08F 283/01* (2013.01); *C08L 51/04* (2013.01); *C08L 33/12* (2013.01); *C08L 2201/50* (2013.01); *C08L 2201/52* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| 8,222,324 B2 | 7/2012 | Yamaguchi et al. |
| 8,680,180 B2 | 3/2014 | Yamaguchi et al. |
| 9,109,069 B2 | 8/2015 | Miyamoto |
| 10,301,464 B2 | 5/2019 | Inoubli et al. |
| 10,513,603 B2 | 12/2019 | Inoubli et al. |
| 10,723,873 B2 | 7/2020 | Inoubli et al. |
| 2014/0378579 A1 | 12/2014 | Perfetti et al. |
| 2021/0171760 A1 | 6/2021 | Gupta et al. |

FOREIGN PATENT DOCUMENTS

| WO | WO9743339 | 11/1997 |
| WO | WO2019011984 A1 | 1/2019 |

*Primary Examiner* — Richard A. Huhn
(74) *Attorney, Agent, or Firm* — Debodhonyaa Sengupta

(57) ABSTRACT

The present invention relates to a composition comprising a compound with two polymerizable groups, a multistage polymer and a thermoplastic polymer its process of preparation and its use. In particular the present invention relates to a composition comprising a compound with two polymerizable groups, a multistage polymer in form of polymeric particles made by a multistage process and a (meth)acrylic polymer. More particularly the present invention relates to polymer composition comprising a compound with two polymerizable groups, polymeric particles made by a multistage process comprising at least two stages and a (meth) acrylic polymer, its method of preparation, its use for making impact modified polymer compositions, comprising thermosetting resins and compositions and articles comprising it.

36 Claims, No Drawings

COMPOSITION COMPRISING A COMPOUND WITH TWO POLYMERIZABLE GROUPS, A MULTISTAGE POLYMER AND A THERMOPLASTIC POLYMER, ITS METHOD OF PREPARATION, ITS USE AND ARTICLE COMPRISING IT

CROSS-REFERENCE TO RELATED APPLICATIONS

This application is a national stage application under 35 U.S.C. § 371 of PCT/EP2020/068107, filed Jun. 26, 2020 which claims benefit to application FR19.06954, filed Jun. 26, 2019.

FIELD OF THE INVENTION

The present invention relates to a composition comprising a compound with two polymerizable groups, a multistage polymer and a thermoplastic polymer its process of preparation and its use.

In particular the present invention relates to a composition comprising a compound with two polymerizable groups, a multistage polymer in form of polymeric particles made by a multistage process and a (meth)acrylic polymer.

More particularly the present invention relates to polymer composition comprising a compound with two polymerizable groups, polymeric particles made by a multistage process comprising at least two stages and a (meth)acrylic polymer, its method of preparation, its use for making impact modified polymer compositions, comprising thermosetting resins and compositions and articles comprising it.

TECHNICAL PROBLEM

Many of today's articles are manufactured from polymeric materials or comprise polymers or polymeric compositions. These articles have to resist to mechanical stress during their use. So they have to be impact modified.

One class of polymeric materials are thermoset polymers, which for example are used in adhesives or polymeric composites.

Thermosetting polymers consist of crosslinked three dimensional structures. The crosslinking for example is obtained by curing reactive groups inside the so called prepolymer. Curing for example can be obtained by heating the polymer chains in order to crosslink and harden the material permanently.

In order to prepare a polymeric thermoset composite material the prepolymer is mixed with the other component such as glass beads or fibres or the other component which is wetted or impregnated and cured afterwards. Example for prepolymers or matrix material for thermoset polymers are unsaturated polyesters, vinylesters, epoxy or phenolic ones.

Thermosetting resins once cured have excellent properties in view of dimensional stability, mechanical strength, electrical insulating properties, heat resistance, water resistance and chemical resistance. Such thermosetting resins are for example epoxy resins or phenolic resins. However such cured resins have small fracture toughness and are brittle.

In order to guarantee and obtain a satisfying mechanical performance over a large temperature range, the impact performance of the thermoset polymer matrix has to be increased.

One form of impact modifiers are core-shell particles also called multistage polymers which are made by a multistage process, with at least stage comprising a rubber like polymer. Afterwards the particles are incorporated in the brittle polymer for composite material or the one of the phases for the structural adhesives, in order to increase the impact resistance of the finished product.

However these kind of multistage polymers are not easy to disperse in all kind of resins or polymers or even monomers, especially in a homogeneous distribution and/or in small or large quantities at a reasonable time; for example in curable resins as unsaturated polyesters or vinylesters, but also other precursors of polymeric phases or monomers for composites and structural adhesives.

A good homogeneous dispersion of the multistage polymer is necessary for having satisfying impact performance. The dispersion should also have a reasonable stability (pot life).

The objective of the present invention is to propose a composition suitable for preparing cured toughened thermoset polymers comprising a multistage polymer and a thermoplastic polymer, which is homogeneous and stable, while having a suitable viscosity for the required application.

An additional objective of the present invention is also to provide a composition suitable for preparing cured thermoset polymers comprising a precursor of the thermoset polymer, a multistage polymer and a thermoplastic polymer, which can be easily and fast prepared.

Another objective of the present invention is to propose a method for manufacturing a composition suitable for preparing cured thermoset polymers comprising a precursor of the thermoset polymer, a multistage polymer and a thermoplastic polymer, which is homogeneous and stable, while having a suitable viscosity for the required application.

Still another objective of the present invention is a method for manufacturing a cured toughened polymer composition with satisfying impact properties.

The objective of the present invention is to propose a process with reduced preparation time of a composition suitable for preparing cured thermoset polymers comprising a multistage polymer.

Still an additional objective is to propose an impact modified cured polymer with satisfying impact properties or adhesive composition, with satisfying impact and adhesive strength properties.

BACKGROUND OF THE INVENTION

Prior Art

The document WO2016/102666 discloses a composition comprising a multistage polymer and its method of preparation. The composition comprises as well a (meth) acrylic polymer that has a mass average molecular weight of less than 100 000 g/mol.

The document WO2016/102682 discloses a multistage polymer composition and its method of preparation. The multistage polymer comprises a last stage that comprises a (meth) acrylic polymer that has a mass average molecular weight of less than 100 000 g/mol.

The document EP2441784A1 discloses a vinyl ester composition that contains polymer fine particles. The polymer fine particles are core shell polymers with a shell comprising aromatic vinyl monomers and vinyl cyan monomer.

The document EP 1 632 533 describes a process for producing modified epoxy resin. The epoxy resin composition is having rubber like polymer particles dispersed in it by a process that brings the particles in contact with an organic medium that disperses the rubber particles.

The document WO2019/011984 discloses a resin composition. The resin composition comprises a resin system, a curative system and a particle system. The particle system is a multistage polymer.

None of the prior art documents discloses a composition or a process as claimed.

BRIEF DESCRIPTION OF THE INVENTION

Surprisingly it has been found that a composition (PC1) comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) a thermoplastic polymer (B1) having a glass transition temperature of at least 30° C. and
- c) a component (LC1) comprising a compound (C1) with at least
two polymerizable groups (PG1) and (PG2),
characterized in that the polymer (B1) has a mass average molecular weight Mw of between 10 000 g/mol and 500 000 g/mol and that the component b) represents at most 40 wt % of a composition based on a) and b) only and the sum of components a) and b) is between 0.5 phr and 100 phr for 100 phr of component c);
can be easily dispersed in the precursors for a polymeric matrix material for thermosetting polymers.

Surprisingly it has also been found that a composition (PC1) comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) a thermoplastic polymer (B1) having a glass transition temperature of at least 30° C. and
- c) a component (LC1) comprising a compound (C1) with at least
two polymerizable groups (PG1) and (PG2),
characterized in that the polymer (B1) has a mass average molecular weight Mw of between 10 000 g/mol and 500 000 g/mol and that the component b) represents at most 40 wt % of a composition based on a), and b) only and the sum of components a) and b) is between 0.5 phr and 100 phr for 100 phr of component c);
has a good stability and stays homogeneous over a long period of time. By a long period of time at least 2 week at 23° C. are meant, and by homogeneous is meant that no significant separation between the respective components takes place.

Surprisingly it has also been found that a method for manufacturing a composition (PC1) comprising the steps of
i) providing a composition (Ci) comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b); and
ii) mixing the composition (Ci) with a composition (Ciia) comprising at least one other component or compound present in the composition (PC1); and
iii) optionally mixing the composition obtained in step ii) with the other components or compounds present in the composition (PC1) that have not been added yet in step ii),
allows to prepare stable and homogeneous compositions and allows as well to reduce preparation time of the composition (PC1) in comparison to a composition not comprising the component b).

Surprisingly it has also been found that a method for manufacturing a composition (PC1) comprising the steps of
i) providing a polymeric composition comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b),
ii) providing c) a component (LC1) comprising a compound (C1) with at least two polymerizable groups (PG1) and (PG2),
iii) mixing the components a), b) and c) in a ratio of sum of components a) and b) is between 0.5 and 100 phr for 100 phr of component c);
yields to a method with reduced preparation time of the composition (PC1) in comparison to a composition not comprising the component b).

Surprisingly it has also been found that the use of a thermoplastic polymer (B1) having a glass transition temperature of at least 30° C. and a mass average molecular weight Mw of between 10 000 g/mol and 500 000 g/mol in a composition (PC1) comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) said thermoplastic polymer (B1) at most 40 wt % of the composition based on a) and b), and
- c) a component (LC1) comprising a compound (C1) with at least two polymerizable groups (PG1) and (PG2),
and the sum of components a) and b) is between 0.5 phr and 100 phr for 100 phr of component c);
reduces the preparation time of the composition (PC1) in comparison to a composition not comprising the component b).

Surprisingly it has also been found that a method for manufacturing the polymer composition (PC2) comprising the steps of
i) providing a polymeric composition (Ci) comprising
- a) a multistage polymer (MP1) comprising
  - a1) one stage (SA1) comprising a polymer (A1) having a glass transition temperature of less than 10° C.

a2) one stage (SA2) comprising a polymer (A2) having a glass transition temperature of at least 60° C. and b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b), ii) providing a composition (Ciib) comprising c) a component (LC1) comprising a compound (C1) with at least two polymerizable groups (PG1) and (PG2), iii) mixing the components a), b) and c) in a ratio of sum of components a) and b) is between 0.5 phr and 100 phr for 100 phr of component c)

iv) polymerizing or curing the mixture.

yields polymer composition that has satisfying toughening and/or impact properties.

Surprisingly it has also been found that a polymeric composition (PC2) comprising a) a multistage polymer (MP1) comprising a1) one stage (SA1) comprising a polymer (A1) having a glass transition temperature of less than 10° C., a2) one stage (SA2) comprising a polymer (A2) having a glass transition temperature of at least 60° C. and b) a thermoplastic polymer (B1) having a glass transition temperature of at least 30° C. and c) a polymer (P2) comprising units from a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a) and b) only and the sum of components a) and b) is between 0.5 phr and 100 phr for 100 phr of component c), has satisfying toughening properties.

DETAILED DESCRIPTION OF THE INVENTION

According to a first aspect, the present invention relates to a composition (PC1) comprising a) a multistage polymer (MP1) comprising a1) one stage (SA1) comprising a polymer (A1) having a glass transition temperature of less than 10° C.

a2) one stage (SA2) comprising a polymer (A2) having a glass transition temperature of at least 60° C. and b) a thermoplastic polymer (B1) having a glass transition temperature of at least 30° C. and c) a component (LC1) comprising a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a) and b) only and the sum of components a) and b) is between 0.5 phr and 100 phr for 100 phr of component c).

According to a second aspect, the present invention relates to a method for manufacturing a composition (PC1) comprising the steps of i) providing a composition (Ci) comprising a) a multistage polymer (MP1) comprising a1) one stage (SA1) comprising a polymer (A1) having a glass transition temperature of less than 10° C.

a2) one stage (SA2) comprising a polymer (A2) having a glass transition temperature of at least 60° C. and b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b); and ii) mixing the composition (Ci) with a composition (Ciia) comprising at least one other component or compound present in the composition (PC1); and iii) optionally mixing the composition obtained in step ii) with the other components or compounds present in the composition (PC1) that have not been added yet in step ii).

In a third aspect the present invention relates to a method for manufacturing a composition (PC1) comprising the steps of i) providing a polymeric composition (Ci) comprising a) a multistage polymer (MP1) comprising a1) one stage (SA1) comprising a polymer (A1) having a glass transition temperature of less than 10° C.

a2) one stage (SA2) comprising a polymer (A2) having a glass transition temperature of at least 60° C. and b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b), ii) providing a composition (Ciib) comprising c) a component (LC1) comprising a compound (C1) with at least two polymerizable groups (PG1) and (PG2), iii) mixing the compositions (Ci) and (Ciib) comprising components a), b) and c) in a ratio that the sum of components a) and b) is between 0.5 phr and 100 phr for 100 phr of component c).

In a fourth aspect the present invention relates to a method for reducing the preparation time of a composition (PC1) comprising the steps of i) providing a polymeric composition (Ci) comprising a) a multistage polymer (MP1) comprising a1) one stage (SA1) comprising a polymer (A1) having a glass transition temperature of less than 10° C.

a2) one stage (SA2) comprising a polymer (A2) having a glass transition temperature of at least 60° C. and b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b), ii) providing a composition (Ciib) comprising c) a component (LC1) comprising a compound (C1) with at least two polymerizable groups (PG1) and (PG2), iii) mixing the components a), b) and c) in a ratio of sum of components a) and b) is between 0.5 phr and 100 phr for 100 phr of component c).

In a fifth aspect the present invention relates to a polymeric composition (PC2) comprising
- a) a multistage polymer (MP1) comprising
  - a1) one stage (SA1) comprising a polymer (A1) having a glass transition temperature of less than 10° C.,
  - a2) one stage (SA2) comprising a polymer (A2) having a glass transition temperature of at least 60° C. and
- b) a thermoplastic polymer (B1) having a glass transition temperature of at least 30° C. and
- c) a polymer (P2) comprising units from a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a) and b) only and the sum of components a) and b) is between 0.5 phr and 100 phr for 100 phr of component c).

According to a sixth aspect, the present invention relates to the use of a composition (PC1) comprising
- a) a multistage polymer (MP1) comprising
  - a1) one stage (SA1) comprising a polymer (A1) having a glass transition temperature of less than 10° C.
  - a2) one stage (SA2) comprising a polymer (A2) having a glass transition temperature of at least 60° C. and
- b) a thermoplastic polymer (B1) having a glass transition temperature of at least 30° C. and
- c) a component (LC1) comprising a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a) and b) only and the sum of components a) and b) is between 0.5 phr and 100 phr for 100 phr of component c); to prepare an impact modified polymeric composition (PC2).

By the term "polymer powder" as used is denoted a polymer comprising powder grain in the range of at least 1 μm obtained by agglomeration of primary polymer comprising particles in the nanometer range.

By the term "primary particle" as used is denoted a spherical polymer particle comprising particle in the nanometer range. Preferably the primary particle has a weight average particle size between 50 nm and 500 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure. In the scope of the invention a thermoplastic polymer can also be crosslinked, if it still can thermoformed.

By the term "thermosetting polymer" as used is denoted a polymer made from prepolymer in a soft, solid or viscous state (for example oligomer having at least two reactive groups or a monomer or a mixture of both) that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "dry" as used is denoted that the ratio of residual water is less than 1.5 wt and preferably less than 1.25 wt %.

By the term "total intruded volume" as used is denoted the total volume intruded by liquid mercury according to ISO 15901-1:2016. This volume is cummulated and the analysis results show cumulated intruded volume in ml/g (cm$^3$/g) as function of the applied pressure or the pore diameter. The total intruded volume is the volume intruded at the maximal applied pressure, which corresponds also to the smallest pores.

By the term "incremental intrusion" as used is denoted the volume intruded in ml/g between two certain pressures or two pore sizes. This incremental intrusion can also be expressed relatively to the total intruded volume in vol %.

By the term "phr" as used is denoted part per hundred by weight. For example 1 phr of compound A in view of compound B in the composition means that 1 kg of compound A is added to 100 kg or present in view of compound B.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to composition (PC1) according to the invention, it is preferably a polymeric composition.

The polymeric composition (PC1) comprises a) a multistage polymer (MP1), b) a thermoplastic polymer (B1) and c) a component (LC1) comprising a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a), and b) only and the sum of components a) and b) is between 0.5 phr and 100 phr for 100 phr of component c).

The multistage polymer (MP1) comprises a1) one stage (SA1) comprising a polymer (A1) having a glass transition temperature of less than 10° C. and a2) one stage (SA2) comprising a polymer (A2) having a glass transition temperature of at least 60° C.

The thermoplastic polymer (B1) having a glass transition temperature of at least 30° C.

The component b) of the composition (PC1) represents at most 40 wt % of a composition based on a) and b) only. The composition based on a) and b) only is referred to as composition (Ci). Preferably the component b) of the composition (Ci) represents at most 35 wt % of the composition based on a)and b) only; more preferably at most 30 wt %, still more preferably less than 30 wt %, advantageously less than 25 wt % and more advantageously less than 20 wt %.

The component b) of the composition (Ci) represents more than 0.5 wt % of a composition based on a) and b) only. Preferably the component b) of the composition (Ci) represents more than 1 wt % of the composition based on a) and b) only; more preferably more than 2 wt %, still more preferably more than 4 wt %, advantageously more than 8 wt % and more advantageously more than 10 wt %.

The component b) represents between 0.5 wt % and 40 wt % of a composition based on a) and b) only. Preferably the component b) represents between 5 wt % and 35 wt % of the composition based on a) and b)only; more preferably between 6 wt % and 30 wt %, still more preferably between 7 wt % and less than 30 wt %, advantageously between 7 wt % and less than 25 wt % and more advantageously between 10 wt % and less than 20 wt %.

At least the component a) of composition (PC1) or composition (Ci) is part of a multistage polymer (MP1).

At least the component a) is obtained by a multistage process comprising at least two stages (SA1) and (SA2); and two polymers (A1) and (A2) form the multistage polymer (MP1).

In the composition (PC1) the sum of components a) and b) is between 0.5 phr and 100 phr for 100 phr of component c). Preferably the sum of components a) and b) is between 1 phr and 100 phr for 100 phr of component c).

In a first more preferred embodiment of the composition (PC1) the sum of components a) and b) is between 1 phr and 50 phr for 100 phr of component c), still more preferably between 1 phr and 25 phr, even more preferably between 1 phr and 20 phr and advantageously between 1 phr and 15 phr.

In a second more preferred embodiment of the composition (PC1) the sum of components a) and b) is between 2 phr and 100 phr for 100 phr of component c), still more preferably between 5 phr and 100 phr, even more preferably between 10 phr and 100 phr and advantageously between 15 phr and 100 phr.

In a third more preferred embodiment of the composition (PC1) the sum of components a) and b) is between 15 phr and 100 phr for 100 phr of component c), still more preferably between 17 phr and 100 phr, even more preferably between 19 phr and 100 phr and advantageously between 21 phr and 100 phr.

In a fourth more preferred embodiment of the composition (PC1) the sum of components a) and b) is between 20 phr and 100 phr for 100 phr of component c), still more preferably between 30 phr and 100 phr, even more preferably between 40 phr and 100 phr and advantageously between 50 phr and 100 phr.

In one embodiment the composition (PC1) is liquid. In that case, the viscosity of the composition (PC1) is between 1 mPa*s and 1000 Pa*s. The viscosity is measured at 25° C. The viscosity is the dynamic viscosity. If there should be shear thinning the value of the dynamic viscosity is taken at a shear rate of 1 l/s. The viscosity is measured with a rheometer.

Preferably the viscosity of the liquid composition (PC1) is between 5 mPa*s and 900 Pa*s, more preferably between 10 mPa*s and 800 Pa*s at a temperature of 25° C. and a shear rate of 1 l/s.

The multistage polymer (MP1) of the composition (PC1) according to the invention has at least two stages (SA1) and (SA2) comprising the polymer (A1) and (A2) respectively, that are different in its respective polymer composition.

The multistage polymer (MP1) is preferably in form of polymeric particles considered as spherical particles. These particles are also called core/shell particles. The first stage (SA1) forms the core, the second stage (SA2) the shell. Optionally all following stages form additional respective shells. Such a multistage polymer (MP1) which is also called core/shell particle is preferred.

The core/shell particles have a weight average particle size (diameter) between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The polymer core/shell particles itself can be agglomerated giving a polymer powder comprising many of such polymer core/shell particles.

The multistage polymer (MP1) has a multilayer structure comprising at least one stage (SA1) comprising a polymer (A1) having a glass transition temperature less than 10° C., at least one stage (SA2) comprising a polymer (A2) having a glass transition temperature over 60° C.

In an optional variation, the multistage polymer (MP1) can also already comprise a stage (SB1) comprising the polymer (B1) having a glass transition temperature over 30° C. In this optional variation, the component b) of the composition (Ci) is combined with the component a) of the composition of the invention. This variation is more detailed explained in the process part.

Preferably the stage (SA1) is the first stage of the at least two stages and the stage (SA2) comprising polymer (A2) is grafted on stage (SA1) comprising polymer (A1) or another optional intermediate layer.

In a further variation there could also be another stage before stage (SA1), so that stage (SA1) would also be a kind of shell, for example on a seed.

In a first embodiment the polymer (A1) having a glass transition temperature of less than or below 10° C. comprises at least 50 wt % of polymeric units coming from alkyl acrylate and the stage (SA1) is the most inner layer of the multistage polymer (MP1) or the polymer particle having the multilayer structure. In other words the stage (SA1) comprising the polymer (A1) is the core of the multistage polymer (MP1) or the polymer particle.

With regard to the polymer (A1) of the first preferred embodiment, it is a (meth) acrylic polymer comprising at least 50 wt % of polymeric units coming from acrylic monomers. Preferably 60 wt % and more preferably 70 wt % of the polymer (A1) are acrylic monomers.

The acrylic momonomer units in polymer (A1) comprises monomers chosen from C1 to C18 alkyl acrylates or mixtures thereof. More preferably acrylic monomer in polymer (A1) comprises monomers of C2 to C12 alkyl acrylic monomers or mixtures thereof Still more preferably acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less than 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 10° C.

In a specific embodiment the polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second preferred embodiment the polymer (A1) having a glass transition temperature below 10° C. comprises at least 50 wt % of polymeric units coming from isoprene or butadiene and the stage (A) is the most inner layer of the polymer particle having the multilayer structure. In other words the stage (SA1) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −85° C. and 0° C. and most advantageously between −80° C. and −20° C.

In a third preferred embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (A2), mention may be made of homopolymers and copolymers comprising monomers with double bonds and/or vinyl monomers. Preferably the polymer (A2) is a (meth) acrylic polymer, comprises more than 50 wt % monomer units coming from (meth)acrylic monomers and optionally commoners that are (meth)acrylic monomers as styrene commoners, for example styrene.

Preferably the polymer (A2) comprises at least 70 wt % monomers chosen from C1 to C12 alkyl (meth)acrylates. Still more preferably the polymer (A2) comprises at least 80 wt % of monomers C1 to C4 alkyl methacrylate and/or C1 to C8 alkyl acrylate monomers.

Most preferably the acrylic or methacrylic monomers of the polymer (A2) are chosen from methyl acrylate, ethyl acrylate, methyl methacrylate, ethyl methacrylate, butyl methacrylate and mixtures thereof, as long as polymer (A2) is having a glass transition temperature of at least 60° C.

Advantageously the polymer (A2) comprises at least 70 wt % of monomer units coming from methyl methacrylate.

Preferably the glass transition temperature Tg of the polymer (A2) is between 60° C. and 150° C. The glass transition temperature of the polymer (A2) is more preferably between 80° C. and 150° C., advantageously between 90° C. and 150° C. and more advantageously between 100° C. and 150° C.

Preferably the polymer (A2) of the multistage polymer (MP1) is grafted on the polymer (A1) made in the previous stage.

In certain embodiments the polymer (A2) is crosslinked.

In one embodiment the polymer (A2) comprises a functional comonomer. The functional copolymer is chosen from acrylic or methacrylic acid, the amides derived from this acids, such as for example dimethylacrylamide, 2-methoxyethyl acrylate or methacrylate, 2-aminoethyl acrylate or methacrylate which are optionally quaternized, polyethylene glycol (meth) acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

With regard to the thermoplastic polymer (B1), it has a mass average molecular weight Mw of between 10 000 g/mol and 500 000 g/mol.

The thermoplastic polymer (B1) has a mass average molecular weight Mw of more than 10 000 g/mol, preferably more than 10 500 g/mol, more preferably more than 11 000 g/mol, still more preferably more than 12 000 g/mol, advantageously more than 13 000 g/mol, more advantageously more than 14 000 g/mol and still more advantageously more than 15 000 g/mol.

The thermoplastic polymer (B1) has a mass average molecular weight Mw below 500 000 g/mol, preferably below 450 000 g/mol, more preferably below 400 000 g/mol, still more preferably below 400 000 g/mol, advantageously below 350 000 g/mol, more advantageously below 300 000 g/mol and still more advantageously below 250 000 g/mol and most advantageously below 200 000 g/mol.

Preferably the mass average molecular weight Mw of polymer (B1) is between 10 500 g/mol and 450 000 g/mol, more preferable between 11 000 g/mol and 400 000 g/mol and even more preferably between 12 000 g/mol and 350 000 g/mol advantageously between 13 000 g/mol and 300 000 g/mol, more advantageously between 14 000 g/mol and 250 000 g/mol and most advantageously between 15 000 g/mol and 200 000 g/mol.

In a first more preferred embodiment the mass average molecular weight Mw of polymer (B1) is between 15 000 g/mol and 300 000 g/mol, more preferable between 15 000 g/mol and 200 000 g/mol and even more preferably between 15 000 g/mol and 190 000 g/mol advantageously between 15 000 g/mol and 180 000 g/mol, more advantageously between 15 000 g/mol and 160 000 g/mol and most advantageously between 15 000 g/mol and 150 000 g/mol.

In a second more preferred embodiment the mass average molecular weight Mw of polymer (B1) is between 15 000 g/mol and 450 000 g/mol, more preferable between 18 000 g/mol and 400 000 g/mol and even more preferably between 20 000 g/mol and 350 000 g/mol advantageously between 22 000 g/mol and 300 000 g/mol, more advantageously between 25 000 g/mol and 250 000 g/mol and most advantageously between 30 000 g/mol and 200 000 g/mol.

Preferably the polymer (B1) is a copolymer comprising (meth)acrylic monomers. More preferably the polymer (B1) is a (meth) acrylic polymer. Still more preferably the polymer (B1) comprises at least 70 wt % monomers chosen from C1 to C12 alkyl (meth)acrylates. Advantageously the polymer (B1) comprises at least 80 wt % of monomers C1 to C4 alkyl methacrylate and/or C1 to C8 alkyl acrylate monomers.

Preferably the glass transition temperature Tg of the polymer (B1) is between 30° C. and 150° C. The glass transition temperature of the polymer (B1) is more preferably between 40° C. and 150° C., advantageously between 45° C. and 150° C. and more advantageously between 50° C. and 150° C.

Preferably the polymer (B1) is not crosslinked.

Preferably the polymer (B1) is not grafted on any of the polymers (A1) or (A2), if it is part of the multistage polymer. This means that the monomer or monomers used for the preparation of the polymer (B1) do not comprise a crosslinker or a graft crosslinker. It cannot be excluded that nevertheless a part of polymer (B1) is linked to the polymers of previous stages. Either due to reactive groups from crosslinking or grafting still present from previous stage or through entanglement for polymer chains. The polymer (B1) can be, at least partly, recovered by extraction with a solvent.

The mass average molecular weight Mw of the polymer (B1) is measured with by size exclusion chromatography (SEC). If the polymer (B1) is part of the multistage polymer, it can be extracted with a solvent an its molecular weight measured; Alternatively the polymer (B1) can be synthesized under the same conditions without the presence of the previous stage, and a "pure" polymer (B1) is obtained for measuring, while avoiding extraction step.

In one embodiment the polymer (B1) comprises also a functional comonomer.

The functional comonomer has the formula (1)

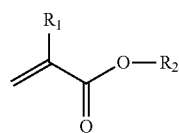

(1)

wherein $R_1$ is chosen from H or $CH_3$ and R2 is H or an aliphatic or aromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth) acrylates. Preferably the polyethylene glycol group of polyethylene glycol (meth) acrylates has a molecular weight ranging from 400 g/mol to 10 000 g/mol.

In a first preferred embodiment the polymer (B1) comprises from 80 wt % to 100 wt % methyl methacrylate, preferably from 80 wt % to 99.9 wt % methyl methacrylate and from 0.1 wt % to 20 wt % of a C1 to C8 alkyl acrylate monomer. Advantageously the C1 to C8 alkyl acrylate monomer is chosen from methyl acrylate, ethyl acrylate or butyl acrylate.

In a second preferred embodiment the polymer (B1) comprises between 0 wt % and 50 wt % of a functional monomer. Preferably the meth)acrylic polymer (B1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

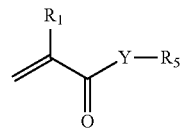

(2)

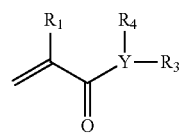

(3)

wherein in both formulas (2) and (3) $R_1$ is chosen from H or $CH_3$ ; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The multistage polymer (MP1) or core/shell polymer particle is obtained by a multistage process comprising at least two stages. At least the components a1) and the component a2) of composition (PC1) are part of a multistage polymer (MP1).

Preferably the polymer (A1) having a glass transition temperature below 10° C. made during the stage (SA1), is made before stage (SA2) or is the first stage of the multistage process.

Preferably the polymer (A2) having a glass transition temperature over 60° C. made during the stage (SA2) is made after the stage (SA1) of the multistage process.

In a first preferred embodiment the thermoplastic polymer (B1) having a glass transition temperature of at least 30° C. is made by a process to give polymeric particles of the polymer (B1). The weight average particle size (diameter) of these particles of polymer (B1) is between 15 nm and 900 nm. Preferably the weight average particle size of the particles of polymer (B1) is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The polymer particles itself can be agglomerated together with the multistage polymer (MP1) particles giving the polymer powder comprising many of both such polymer particles. This yield to the composition (Ci) comprising the components a) and b).

In a second preferred embodiment the polymer (B1) having a glass transition temperature of at least 30° C. is the external layer of the polymer particle having the multilayer structure in other words of the multistage polymer (MP1).

The polymer (B1) having a glass transition temperature over 30° C. made during the stage (SB1), is made after the stage (SA2) of the multistage process. There could be additional intermediate stages, either between stage (SA1) and stage (SA2) and/or between stage (SA2) and stage (SB1). This yields also to the composition (Ci) comprising the components a) and b).

At least a part of the polymer (B1) could be grafted on the polymer made in the previous layer or entangled with polymer chains of previous layer. If there are only two stages (SA1) and (SA2) comprising polymer (A1) and (A2) respectively, a part of polymer (B1) could be grafted on polymer (A2) or entangled with the chains of polymer (A2).

In one embodiment, at least 50 wt % of polymer (B1) is grafted.

In another embodiment, less than 50 wt % of polymer (B1) is grafted.

In still another embodiment, less than 20 wt % of polymer (B1) is grafted.

In still another embodiment, between 5 wt % and 60 wt % of polymer (B1) is grafted.

In still another embodiment, less than 5 wt % of polymer (B1) is grafted.

In still another embodiment, 0 wt % of polymer (B1) is grafted

The ratio of grafting can be determined by extraction with a solvent for the polymer (B1) and gravimetric measurement before and after extraction to determine the non-grafted quantity.

The polymer (B1) and the polymer (A2) are not the same polymer, even if their composition could be very close and some of their characteristics are overlapping. The essential difference is that the polymer (A2) is always part of the multistage polymer (MP1). As explained earlier, there are embodiments, where the polymer (B1) can also be part of the multistage polymer, however the polymer (B1) is not voluntary grafted on the multistage polymer (MP1).

The glass transition temperature Tg of the respective polymers can be estimated for example by dynamic methods as thermo mechanical analysis.

In order to obtain a sample of the respective polymers (A1) and (A2) they can be prepared alone, and not by a multistage process, for estimating and measuring more easily the glass transition temperature Tg individually of the respective polymers of the respective stages. The polymer (B1) can be extracted for estimating and measuring the glass transition temperature Tg easier.

With regard to the component (LC1) of the composition (PC1), it is preferably a liquid.

The viscosity is between 0.5 mPa*s and 10 Pa*s at 25° C. Preferably the viscosity is between 1 mPa*s and 10 Pa*s, more preferably between 10 mPa*s and 10 Pa*s, even more preferably between 50 mPa*s and 10 Pa*s and advantageously between 100 mPa*s and 10 Pa*s. The viscosity of (LC1)is the dynamic viscosity. If there should be shear thinning the value of the dynamic viscosity is taken at a shear rate of 1 l/s. The viscosity is measured with a rheometer.

The component (LC1) can also be a mixture of several compounds, one of them being the compound (C1) with at least two polymerizable groups (PG1) and (PG2).

The component (LC1) or liquid component (LC1) can additionally comprise a monomer (M1) or a mixture of monomers (Mx). The monomer (M1) or the mixture of monomers (Mx) comprise at least one carbon double bond.

The monomer (M1) can be chosen from (meth)acrylic monomers, allyl monomers or styrenic monomers or mixtures thereof for (Mx).

In a variation monomer (M1) can be chosen from (meth) acrylic monomers, allyl monomers or mixtures thereof for (Mx).

Preferably the monomer (M1) is chosen from styrene, α-methylstyrene, vinyltoluene, divinylbenzene, alkyl (meth) acrylates that have an alkyl group containing 1 to 10 carbon atoms, and hydroxyethyl (meth)acrylate, as well as bifunctional (meth) acrylates such as butanediol di (meth) acrylate, 1,6-hexanediol di(meth)acrylate and di (meth) acrylates having a glycol structure, and polyfunctional (meth)acrylates such as trimethylolpropane tri (meth) acrylate.

In a first more preferred embodiment the monomer (M1) is chosen from alkyl (meth)acrylates that have an alkyl group containing 1 to 10 carbon atoms, and hydroxyethyl (meth)acrylate, as well as bifunctional (meth) acrylates such as butanediol di (meth) acrylate, 1,6-hexanediol di(meth) acrylate and di (meth) acrylates having a glycol structure, and polyfunctional (meth)acrylates such as trimethylolpropane tri (meth) acrylate.

In a second more preferred embodiment the monomer (M1) or mixtures thereof for (Mx) comprises no styrene.

In a third more preferred embodiment the monomer (M1) or mixtures thereof for (Mx) comprises no styrene based monomers.

The two polymerizable groups (PG1) and (PG2) of compound (C1) are preferably carbon double bonds.

The two polymerizable groups (PG1) and (PG2) of compound (C1) are more preferably α,β-unsaturated carbonyl groups.

The two polymerizable groups (PG1) and (PG2) of compound (C1) can be chosen from an acrylate group, a methacylate group or a condensation product comprising maleic acid or itaconic acid or fumaric acid.

Preferably the compound (C1) is a vinyl ester or an unsaturated polyester

In a first more preferred embodiment the compound (C1) is a vinyl ester. The vinyl ester is typically a reaction product obtainable by reacting a polyepoxide (such as an epoxy resin) with an ethylenically unsaturated double bond-containing monocarboxylic acid as (meth) acrylic acid for example, it has the same backbone as the polyepoxide in a main chain thereof, and is curable due to the presence of unsaturated double bonds in a molecule thereof. The backbone is preferably one or more types of backbones selected from the group consisting of backbones of bisphenol A, bisphenol F, phenol novolak, cresol novolak, hydrogenated bisphenol A, hydrogenated bisphenol F, aliphatic ester, aliphatic ether, and aromatic ester types.

In a second more preferred embodiment the compound (C1) is an unsaturated polyester. The unsaturated polyester is a reaction product of at least one dibasic organic acid or its anhydride and at least one polyhydric alcohol.

Optionally the component (LC1) can comprise an initiator for radical polymerization. For example, an organic peroxide may be added.

The present invention relates also to a method for manufacturing a composition (PC1).

With regard to a first preferred method for manufacturing the composition (PC1) according to the invention it comprises the steps of
- i) providing a composition (Ci) comprising
  - a) a multistage polymer (MP1) comprising
    - a1) one stage (SA1) comprising a polymer (A1) having a glass transition temperature of less than 10° C.
    - a2) one stage (SA2) comprising a polymer (A2) having a glass transition temperature of at least 60° C. and
  - b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b); and
- ii) mixing the composition (Ci) with a composition (Ciia) comprising at least one other component or compound present in the composition (PC1); and
- iii) optionally mixing the composition obtained in step ii) with the other components or compounds present in the composition (PC1) that have not been added yet in step ii).

The composition (Ciia) can comprise:
a polyepoxide or
a polyepoxid and organic acid with a doublebond or
a vinylester or
a vinylester and monomer (M1) or the mixture of monomers (Mx)
unsaturated polyester or
unsaturated polyster and monomer (M1) or the mixture of monomers (Mx).

The other components or compounds that are optionally added in step iii) are monomer (M1) or the mixture of monomers (Mx) or initiator for polymerization. The monomer (M1) or the mixture of monomers (Mx) are added in step iii) if they not have been added in step ii, because they were not present in the composition (Ciia) or additional monomer (M1) or the mixture of monomers (Mx) are added in step iii) when they were present in the composition (Ciia) of step ii).

In a first preferred embodiment, the composition (Ciia) comprises a polyepoxide.

In a second preferred embodiment, the composition (Ciia) comprises polyepoxid and organic acid with a double bond.

In a third preferred embodiment, the composition (Ciia) comprises a vinylester.

In a fourth preferred embodiment, the composition (Ciia) comprises a vinylester and monomer (M1) or the mixture of monomers (Mx).

In a fifth preferred embodiment, the composition (Ciia) comprises an unsaturated polyester.

In a sixth preferred embodiment, the composition (Ciia) comprises an unsaturated polyester and monomer (M1) or the mixture of monomers (Mx).

The steps ii) and iii) of the first preferred method for manufacturing the composition (PC1) will add and form the compound (C1) with at least two polymerizable groups (PG1) and (PG2), if Preferably the steps i) to iii) are made in the indicated order.

With regard to a second preferred method for manufacturing the composition (PC1) according to the invention it comprises the steps of
- i) providing a composition (Ci) comprising
  - a) a multistage polymer (MP1) comprising
    - a1) one stage (A1) comprising a polymer (A1) having a glass transition temperature of less than 10° C.
    - a2) one stage (A2) comprising a polymer (A2) having a glass transition temperature of at least 60° C. and
  - b) a thermoplastic polymer (B1) having a glass transition temperature of at least 30° C. and a mass average molecular weight Mw of between 10 000 g/mol and 500 000 g/mol so that the component b) represents at most 40 wt % of a composition based on a) and b); and
- ii) providing a composition (Ciib) comprising c) a component (LC1) comprising a compound (C1) with at least two polymerizable groups (PG1) and (PG2) or a precursor or the precursors for compound (C1),
- iii) mixing the composition from i) with a composition from ii).

The composition (Ciib) can comprise:
a polyepoxide or
a polyepoxid and organic acid with a doublebond or
a vinylester or
a vinylester and monomer (M1) or the mixture of monomers (Mx)
unsaturated polyester or
unsaturated poleyster and monomer (M1) or the mixture of monomers (Mx).

The second preferred method for manufacturing the composition (PC1) can also comprising the optional additional step iv) of adding other components or compounds.

Preferably the steps i) to iii) are made in the indicated order.

In a first preferred embodiment, the composition (Ciib) comprises a polyepoxide.

In a second preferred embodiment, the composition (Ciib) comprises polyepoxid and organic acid with a double bond.

In a third preferred embodiment, the composition (Ciib) comprises a vinylester.

In a fourth preferred embodiment, the composition (Ciib) comprises a vinylester and monomer (M1) or the mixture of monomers (Mx).

In a fifth preferred embodiment, the composition (Ciib) comprises an unsaturated polyester.

In a sixth preferred embodiment, the composition (Ciib) comprises an unsaturated polyester and monomer (M1) or the mixture of monomers (Mx).

With regard to a third preferred method for a method for manufacturing a composition (PC1) according to the invention it comprises the steps of
- i) providing a polymeric composition comprising
  - a) a multistage polymer (MP1) comprising
    - a1) one stage (SA1) comprising a polymer (A1) having a glass transition temperature of less than 10° C.
    - a2) one stage (SA2) comprising a polymer (A2) having a glass transition temperature of at least 60° C. and
  - b) a thermoplastic polymer (B1) having a glass transition temperature of at least 30° C.,
- ii) providing c) a component (LC1) comprising a compound (C1) with at least two polymerizable groups (PG1) and (PG2),
- iii) mixing the components a), b) and c).

The compound (C1) is a polyepoxide, a vinylester or an unsaturated polyester.

In a first preferred embodiment, the compound (C1) is a polyepoxide.

In a second preferred embodiment, the compound (C1) is a vinylester.

In a third preferred embodiment, the compound (C1) is an unsaturated polyester.

In more preferred embodiment, the compound (C1) is a vinylester.

The mixing of the respective components of all embodiments can be made by agitation. The agitation is made with a stirrer.

The important condition of the mixing step is the temperature. Preferably, the temperature of the mixing step is between 0° C. and 50° C., more preferably between 5° C. and 45° C., even more preferably between 10° C. and 40° C., most preferably between 10° C. and 35° C. and advantageously between 10° C. and 30° C.

The time required for the mixing step is less than compared to a composition not comprising the thermoplastic polymer (B1) having a glass transition temperature of at least 30° C.

The mixing time is preferably less than 120 min and advantageously less than 90 min (lab scale). This parameter is influenced by the used quantities. For the same ratio of components, the time can be shorter if less absolute over all quantities are used.

The different processes for manufacturing the composition (PC1) preferably uses a multistage polymer (MP1) or composition (Ci) in form of a polymer powder POW1 which is having a total intruded volume of at least 1.2 ml/g as measured by mercury porosimetry.

The porosity of the polymer powder POW1 is expressed as total intruded volume or total cuumulative intrusion (cumulative intruded volume) in millilitre (ml) of mercury per mass (g) of said polymer powder POW1. This is measured according to the norm ISO 15901-1: Evaluation of pore size distribution and porosity of solid materials by mercury porosity and gas adsorption—Part 1: mercury porosity. The total cumulative intrusion is taken into account until a pore size diameter of 0.005 µm.

The polymer powder POW1 has a total intruded volume or total cumulative intrusion of at most 10 ml/g. Preferably the polymer powder POW1 of the invention has a total intruded volume or total cumulative intrusion between 1.2 ml/g and 10 ml/g.

The incremental intrusion (incremental intruded volume) is the volume between two certain pore diameters. The incremental intrusion can be expressed as an absolute value also in ml/g or as a relative value es percentage of total intruded volume or total cumulative intrusion. Preferably the polymer powder POW1 has a relative incremental intrusion for a pore size above 10 µm (larger than 10 µm) of at most 85%. Preferably the polymer powder POW1 has a cumulative intrusion for a pore size above 10 µm (larger than 10 µm) of at least 0.9 ml/g.

The present invention relates also to the use of the composition (PC1). The composition (PC1) is used to prepare a toughened polymeric composition (PC2).

The polymeric composition (PC2) is prepared by polymerizing the compound (C1) with at least two polymerizable groups (PG1) and (PG2) of the component (LC1). After the polymerizing the compound (C1) the polymer (P2) is obtained.

The present invention relates to a polymeric composition (PC2) comprising
a) a multistage polymer (MP1) comprising
a1) one stage (SA1) comprising a polymer (A1) having a glass transition temperature of less than 10° C.,
a2) one stage (SA2) comprising a polymer (A2) having a glass transition temperature of at least 60° C. and
b) a thermoplastic polymer (B1) having a glass transition temperature of at least 30° C. and
c) a polymer (P2) comprising units from a compound (C1) with at least two polymerizable groups (PG1) and (PG2), characterized in that the polymer (B1) has a mass average molecular weight Mw of between 10 000 g/mol and 500 000 g/mol and that the component b) represents at most 40 wt % of a composition based on a), and b) only and the sum of components a) and b) is between 0.5 and 100 phr for 100 phr of component c).

The polymer (P2) is a thermoset polymer.

The polymeric composition (PC2) can comprise optionally other components as fibers or mineral fillers. Preferably the other components of the polymeric composition (PC2) are chosen from fibers or mineral fillers. In that case the polymeric composition (PC2) is a polymeric composite.

The polymeric composition (PC2) can be used as an adhesive and more preferably a structural adhesive or in a polymeric composite; or in applications as coating, decorative casting, flooring, polymer concrete, solid surfaces, artificial marble, or in marine applications, building and construction, wind energy applications.

Methods of Evaluation

Glass Transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample as function of the temperature, the strain or the deformation applied. Strain is 0.1%. The temperature range is between −125° C. and 150° C. and the temperature is changed at 2° C./min. The apparatus records continuously, the sample deformation, keeping the strain fixed, during a controlled program of temperature variation. The results are obtained by drawing, in function of the temperature, the elastic modulus (G'), the loss modulus and the tan delta. The Tg is highest temperature value read in the tan delta curve, when the derived of tan delta is equal to zero.

Molecular Weight

The mass average molecular weight (Mw) of the polymers is measured with by size exclusion chromatography (SEC). Polystyrene standards are used for calibration. The polymer is dissolved in THF at a concentration of 1 g/L. The chromatography column uses modified silica. The flow is 1 ml/min and a detector of refractive index is used.

Particle Size Analysis

The particle size of the primary particles after the multistage polymerization is measured with a Zetasizer.
The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 μm is used.

Porosity

The porosity of a polymer powder POW1 is expressed as total intruded volume or total ccumulative intrusion (cumulative intruded volume) in millilitre (ml) of mercury per mass (g) of said polymer powder POW1. This is measured according to the norm ISO 15901-1: Evaluation of pore size distribution and porosity of solid materials by mercury porosity and gas adsorption—Part 1: mercury porosity.

EXAMPLES

Raw Materials

As component (LC1) the commercial resins ATLAC430, ATLAC590 and ATLAC P600 from the company Aliancys are used.

The multistage polymer (MP1) is made according to the following synthesis: First stage (SA1)—polymerization of a polymer type (A1): To a 20 litres high-pressure reactor was charged: de-ionized water 116.5 parts, emulsifier potassium salt of beef tallow fatty acid 0.1 part, 1,3-butadiene 21.9 parts, t-dodecyl mercaptan 0.1 parts, and p-menthane hydroperoxide 0.1 parts as an initial kettle charge. The solution was heated, with agitation, to 43° C. at which time a redox-based catalyst solution was charged (water 4.5 parts, sodium tetrapyrophosphate 0.3 parts, ferrous sulphate 0.004 parts and dextrose 0.3 parts), effectively initiating the polymerization. Then the solution was further heated to 56° C. and held at this temperature for a period of three hours. Three hours after polymerization initiation, a second monomer charge (77.8 parts BD, t-dodecyl mercaptan 0.2 parts), one-half of an additional emulsifier and reductant charge (de-ionized water 30.4 parts, emulsifier potassium salt of beef tallow fatty acid 2.8 parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours. Thirteen hours after polymerization initiation, the solution was heated to 68° C. and allowed to react until at least twenty hours had elapsed since polymerization initiation, producing polybutadiene rubber latex, R1. The resultant polybutadiene rubber latex (A1) contained 38% solids and had a weight average particle size of about 160 nm.

Second stage (SA2)—Polymerization of polymer type (A2): into a 3.9 litres reactor was charged 75.0 parts, on a solids basis, of polybutadiene rubber latex R1, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.4 parts divinyl benzene and 0.1 parts t-butyl hydroperoxide initiator was continuously added over 70 minutes, followed by o hold period of 80 minutes. Thirty minutes after the onset of the hold period, 0.1 parts of sodium formaldehyde sulfoxylate and 0.1 parts t-butyl hydroperoxide were added to the reactor at once. Following the 80-minute hold period, a stabilization emulsion was added to the graft copolymer latex. The stabilization emulsion was prepared by mixing 3.2 parts de-ionized water (based on graft copolymer mass), 0.1 parts oleic acid, 0.1 parts potassium hydroxyde, and 0.9 parts octadecyl-3-(3,5-di-tertbutyl-4-hydroxyphenyl)propionate. The resultant core shell polymer (A1+A2) had a weight average particle size of about 180 nm. The final multistage polymer (MP1) was then recovered, the polymer composition being coagulated and dried giving a powder of core/shell-1.

According to a preferred embodiment the thermoplastic polymer (B1) having a glass transition temperature of at least 30° C. is made as an additional stage on the multistage polymer (MP1)—Polymerization of polymer composition type C1 Synthesis of the polymer (B1): semi continuous process: charged into a reactor, with stirring, were 10 000 g of core shell polymer (A1+A2) still in dispersion in de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution of added raw materials exept core-shell polymer. Three vacuum-nitrogen purges were carried out in succession and the reactor left under a slight vacuum. The reactor was then heated. At the same time, a mixture comprising 1066.7 g of methyl methacrylate and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The mass average molecular weight of the copolymer B1 is $M_w$=28 000 g/mol.

The final polymer composition consisting of the multistage polymer (MP1) and polymer (B1) was then recovered, the polymer composition being coagulated and dried giving a power of core/shell-2.

Mixing of components: 100 g of component (LC1) are put in a recipient made of aluminium. Varying quantities of multistage polymer (MP1) either already comprising the thermoplastic polymer (B1) or not, in form of powder are added. It is agitated for 60 min with a speed of 150-200 rpm.

Rheology: the viscosity of the compositions is measured with a Anton Parr Rheometer. A cone-plate geometry is used (module CP-50) at 25° C.

Dispersion test: 5 wt % of the component MP1 or MP1+B1 in powder form are added into 95% of the component LC1. In standard conditions the mixing is applied using a dispersion blade at 100-200 RPM. After 60 minutes the aspect of the dispersion is evaluated as a function of the presence of undispersed powder particle (small grains), agglomeration of powder particle, single phase or biphasic dispersion and the presence of bubbles. In the case of bad dispersion, extra mixing for 60 minutes was applied at 500 RPM. Same procedure is made with quantity of component MP1 or MP1+B1.

Sample preparation to produce parts for mechanical test: standard BPO/Amine system (Benzoyl peroxide/Dimethylaniline) curing agent were used. Dosage were selected in order to get a gel time around 30 min at room temperature.

Mechanical evaluation: tensile properties like elongation at break, tensile strength, and young modulus were evaluated using a ZWICK Z050 TH AllroundLine equipped with a 50 kN cell following ISO 527 specification Lap shear evaluation: were evaluated using a ZWICK Z050 TH AllroundLine equipped with a 50 kN cell following EN 1465 specification. Aluminium plates were used as substrate.

Composition Examples: a composition is made of following compounds:

TABLE 1 composition and dispersion results in ATLAC resins

| | Comparative Neat Resin | Comparative Core/Shell-1 | Inventive Core/Shell-2 |
|---|---|---|---|
| Core/shell content | 0 wt % | 5 wt % | 5 wt % |
| ATLAC 430 | | | |
| Core/shell dispersion in ATLAC 430 | — | Difficult/Long | Easy/Fast |
| Viscosity @ 1 s−1 (Pa · s) | 1 | 12.44 | 2.36 |
| Dispersion appearance | | Bi phasic With Grains | Homogeneous, white |
| Dispersion appearance after extra mixing (1 h under 500 rpm) | — | Homogeneous, white | — (no change) |
| Viscosity at 1 s−1 after extra mixing (Pa · s) | | 3.8 | |
| ATLAC P600 | | | |
| Core/shell dispersion in ATLAC P600 | — | | Easy/Fast |
| Viscosity at 1 s−1(Pa · s) | 1.24 | 2.22 | 2.05 |
| Dispersion appearance | | Transparent, slightly biphasic, presence of grains (smaller amount) | Homogeneous, transparent |
| ATLAC 590 | | | |
| Core/shell dispersion in ATLAC 590 | — | Long/Difficult | Easy/Fast |
| Viscosity at 1 s−1(Pa · s) | 0.23 | 1.86 | 1.51 |
| Dispersion appearance | | Transparent but bi phasic with grains | Homogeneous, transparent |

The composition based on the invention (comprising compound b) the thermoplastic polymer (B1)) can be easily and fast prepared for different compound c). The obtained dispersions are inventive homogeneous.

TABLE 2 mechanical properties results in polymerized ATLAC 430

| | Comparative Neat Resin | Inventive Core/Shell-2 |
|---|---|---|
| Core/shell content | 0 wt % | 5 wt % |
| Young Modulus (GPa) | 2.66 +/− 0.09 | 3.32 +/− 0.05 |
| Lap Shear Stress at break (MPa) | 5.1 +/− 0.1 | 7.0 +/− 0.6 |
| $K_{1c}$ (MPa · m$^{1/2}$) | 0.58 +/− 0.20 | 1.29 +/− 0.39 |
| $G_{1c}$ (kJ/m$^2$) | 0.23 +/− 0.10 | 1.49 +/− 0.39 |

In table 2 a significant increase in toughening is observed for a polymer obtained from a composition according to the invention. The fracture toughness increase significantly, as the crack growth resistance $K_{1c}$ and the fracture toughness $G_{1c}$ show.

The invention claimed is:
1. A polymeric composition (PC2) comprising:
   a) a multistage polymer (MP1) comprising
      a1) one stage (A1) comprising a polymer (A1) having a glass transition temperature of less than 10° C.,
      a2) one stage (A2) comprising a polymer (A2) having a glass transition temperature of at least 60° C., and
   b) a thermoplastic polymer (B1) having a glass transition temperature of at least 30° C., and
   c) a polymer (P2) comprising units from a compound (C1) with at least two polymerizable groups (PG1) and (PG2),
wherein polymer (B1) has a mass average molecular weight Mw of between 10,000 g/mol and 500,000 g/mol and that the component b) represents at most 40 wt % of a composition based on a), and b) only and the sum of components a) and b) is between 0.5 phr and 100 phr for 100 phr of component c).

2. The polymeric composition (PC2) according to claim 1, wherein polymer (P2) is a thermoset polymer.

3. The polymeric composition (PC2) according to claim 1 wherein polymeric composition (PC2) comprises other components as fibers or mineral fillers.

4. A composition (PC1) comprising:
   a) a multistage polymer (MP1) comprising
      a1) one stage (A1) comprising a polymer (A1) having a glass transition temperature of less than 10° C.,
      a2) one stage (A2) comprising a polymer (A1) having a glass transition temperature of at least 60° C., and
   b) a thermoplastic polymer (B1) having a glass transition temperature of at least 30° C., and
   c) a component (LC1) comprising a compound (C1) with at least two polymerizable groups (PG1) and (PG2),
wherein the polymer (B1) has a mass average molecular weight Mw of between 10,000 g/mol and 500,000 g/mol and the component b) represents at most 40 wt % of a composition based on a) and b) only and the sum of components a) and b) is between 0.5 phr and 100 phr for 100 phr of component c).

5. The composition according to claim 4, wherein polymer (B1) is a (meth)acrylic polymer.

6. The composition according to claim 4 wherein polymer (B1) comprises at least 70 wt % monomers chosen from C1 to C12 alkyl (meth)acrylates.

7. The composition according to claim 4 wherein the sum of components a) and b) is between 1 phr and 15 phr for 100 phr of component c).

8. The composition according to claim 4 wherein the sum of components a) and b) is between 15 phr and 100 phr for 100 phr of component c).

9. The composition according to claim 4 wherein the sum of components a) and b) is between 21 phr and 100 phr for 100 phr of component c).

10. The composition according to claim 4 wherein the sum of components a) and b) is between 50 phr and phr for 100 phr of component c).

11. The composition according to claim 4 wherein composition (PC1) is liquid having a viscosity between 1 mPa*s and 1000 Pa*s at 25° C.

12. The composition according to claim 4 wherein multistage polymer (MP1) is a core/shell particle having a weight average particle size between 15 nm and 900 nm.

13. The composition according to claim 4 wherein the mass average molecular weight Mw of polymer (B1) is between 15,000 g/mol and 150,000 g/mol.

14. The composition according to claim 4 wherein the the mass average molecular weight Mw of polymer (B1) is between 30,000 g/mol and 200,000 g/mol.

15. The composition according to claim 4 wherein polymer (B1) comprises a functional comonomer having the formula (1)

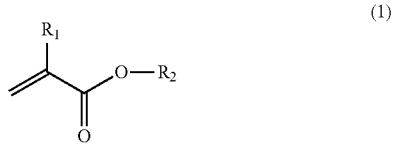

wherin $R_1$ is H or $CH_3$ and $R_2$ is H or an aliphatic or aromatic radical having at least one atom that is not C or H.

16. The composition according to claim 4 wherein component (LC1) is a liquid having a viscosity between 0.5 mPa*s and 10 Pa*s at 25° C.

17. The composition according to claim 4 wherein component (LC1) additionally comprises a monomer (M1) or a mixture of monomers (Mx).

18. The composition according to claim 17 wherein monomer (M1) or the mixture of monomers (Mx) is chosen from (meth)acrylic monomers, allyl monomers and styrenic monomers.

19. The composition according to claim 17 wherein monomer (M1) or the mixture of monomers (Mx) is chosen from alkyl (meth)acrylates that have an alkyl group containing 1 to 10 carbon atoms, hydroxyethyl (meth)acrylate, bifunctional (meth) acrylates, butanediol di (meth) acrylate, 1,6-hexanediol di(meth) acrylate and di(meth) acrylates having a glycol structure, polyfunctional (meth)acrylates, trimethylolpropane, and tri (meth) acrylate.

20. The composition according to claim 17 wherein monomer (M1) or the mixture of monomers (Mx) comprises no styrene.

21. The composition according to claim 17 wherein monomer (M1) or the mixture of monomers (Mx) comprises no styrene-based monomers.

22. The composition according to claim 4 wherein two polymerizable groups (PG1) and (PG2) of compound (C1) are carbon double bonds.

23. The composition according to claim 4 wherein two polymerizable groups (PG1) and (PG2) of compound (C1) are α, β-unsaturated carbonyl groups.

24. The composition according to claim 4 wherein two polymerizable groups (PG1) and (PG2) of compound (C1) are chosen from an acrylate group, a methacylate group, and a condensation product comprising maleic acid or itaconic acid or fumaric acid.

25. The composition according to claim 4 wherein compound (C1) is a vinyl ester or an unsaturated polyester.

26. The composition according to claim 4 wherein compound (C1) is a vinyl ester.

27. The composition according to claim 4 wherein compound (C1) is an unsaturated polyester.

28. The composition according to claim 4 wherein component b) represents between 10 wt % and 20 wt % of a composition based on a) and b) only.

29. A method for manufacturing a composition (PC1) according to claim 4 comprising the steps of:
 i) providing a composition (Ci) comprising
  a) a multistage polymer (MP1) comprising
   a1) one stage (A1) comprising a polymer (A1) having a glass transition temperature of less than 10° C.,
   a2) one stage (A2) comprising a polymer (A2) having a glass transition temperature of at least 60° C., and
  b) a thermoplastic polymer (B1) having a glass transition temperature of at least 30° C. and a mass average molecular weight Mw of between 10,000 g/mol and 500,000 g/mol so that the component b) represents at most 40 wt % of a composition based on a) and b); and
 ii) mixing composition (Ci) with a composition (Ciia) comprising at least one other component or compound present in the composition (PC1); and
 iii) optionally mixing the composition obtained in step ii) with other components or compounds present in the composition (PC1) that have not been added yet in step ii).

30. The method according to claim 29 wherein the composition (Ciia) comprises:
 a polyepoxide, or
  a polyepoxide and organic acid with a double bond, or
 a vinylester, or
  a vinylester and monomer (M1) or mixture of monomers (Mx),
 unsaturated polyester, or
 unsaturated polyester and monomer (M1) or the mixture of monomers (Mx).

31. The method according to claim 29 wherein in step iii) the mixing is at a temperature between 0°° C. and 50° C.

32. The method according to claim 29 wherein the multistage polymer (MP1) provided is a polymer powder having a total intruded volume of at least 1.2 ml/g as measured by mercury porosimetry.

33. The method according to claim 29 wherein the multistage polymer (MP1) provided is a polymer powder having relative incremental intrusion of the polymer powder for a pore size above 10 μm of at most 85%.

34. A method for manufacturing the composition (PC1) according to claim 4 comprising the steps of:
 i) providing a polymeric composition (Ci) comprising
  a) a multistage polymer (MP1) comprising
   a1) one stage (A1) comprising a polymer (A1) having a glass transition temperature of less than 10° C.,
   a2) one stage (A2) comprising a polymer (A2) having a glass transition temperature of at least 60° C., and
  b) a thermoplastic polymer (B1) having a glass transition temperature of at least 30° C. and a mass average molecular weight Mw of between 10,000 g/mol and 500,000 g/mol so that the component b) represents at most 40 wt % of a composition based on a) and b),
 ii) providing a composition (Ciib) comprising c) a component (LC1) comprising a compound (C1) with at least two polymerizable groups (PG1) and (PG2),
 iii) mixing the compositions (Ci) and (Ciib) comprising the components a), b) and c) in a ratio that the sum of components a) and b) is between 0.5 phr and 100 phr for 100 phr of component c).

35. The method according to claim 34 wherein the composition (Ciib) comprises:
- a polyepoxide, or
- a polyepoxide and organic acid with a double bond, or
- a vinylester, or
- a vinylester and monomer (M1) or mixture of monomers (Mx),
- unsaturated polyester, or
- unsaturated polyester and monomer (M1) or the mixture of monomers (Mx).

36. A method for manufacturing the composition (PC1) according to claim 4 comprising the steps of:
  i) providing a polymeric composition comprising
     a) a multistage polymer (MP1) comprising
        a1) one stage (A1) comprising a polymer (A1) having a glass transition temperature of less than 10° C.,
        a2) one stage (A2) comprising a polymer (A2) having a glass transition temperature of at least 60° C., and
     b) a thermoplastic polymer (B1) having a glass transition temperature of at least 30° C.,
  ii) providing c) a component (LC1) comprising a compound (C1) with at least two polymerizable groups (PG1) and (PG2),
  iii) mixing the components a), b) and c).

* * * * *